United States Patent [19]
Haubner et al.

[11] Patent Number: 5,948,297
[45] Date of Patent: Sep. 7, 1999

[54] METHOD AND CIRCUIT ARRANGEMENT FOR OPERATING AN ELECTRIC SEAT HEATING MEANS OF A VEHICLE

[75] Inventors: Georg Haubner, Berg; Günter Lorenzen, Olching, both of Germany

[73] Assignee: W.E.T. Automotive Systems AG, Odelzhausen, Germany

[21] Appl. No.: 08/917,233

[22] Filed: Aug. 25, 1997

Related U.S. Application Data

[63] Continuation of application No. 08/569,081, filed as application No. PCT/EP94/01601, May 18, 1994.

[30] Foreign Application Priority Data

Jun. 3, 1993 [DE] Germany .............................. 43 18 432

[51] Int. Cl.⁶ .................................. B60L 1/02; A47C 7/72
[52] U.S. Cl. ...................................... 219/202; 297/180.12
[58] Field of Search .................................. 219/202, 217, 219/201; 297/180.12

[56] References Cited

U.S. PATENT DOCUMENTS

| | | | |
|---|---|---|---|
| 3,738,702 | 6/1973 | Jacobs | 297/180 |
| 4,306,218 | 12/1981 | Leconte et al. | 364/66 |
| 4,735,088 | 4/1988 | Pinyan et al. | 73/629 |
| 4,813,738 | 3/1989 | Ito | 297/180 |
| 4,816,647 | 3/1989 | Payne | 219/464 |
| 4,825,048 | 4/1989 | Altmann et al. | 219/528 |
| 4,952,776 | 8/1990 | Huguet | 219/217 |
| 4,964,674 | 10/1990 | Altmann et al. | 297/180 |
| 5,288,974 | 2/1994 | Hanzic | 219/501 |
| 5,319,929 | 6/1994 | Cornelison et al. | 60/274 |
| 5,422,461 | 6/1995 | Weiss et al. | 219/501 |
| 5,488,218 | 1/1996 | Olsen et al. | 219/492 |

FOREIGN PATENT DOCUMENTS 33 29 354  2/1985  Germany .

*Primary Examiner*—Teresa Walberg
*Assistant Examiner*—Daniel Robinson
*Attorney, Agent, or Firm*—Browdy and Neimark

[57] ABSTRACT

In a method and the arrangement for operating an electric seat heating apparatus of a vehicle, it is provided, with a view to optimizing the heat-up behavior, that the given heat-up time or temperature, respectively, being reached, the heating power is preset by a microprocessor as a function of a field of characteristic curves or tables stored in a non-volatile memory such that for seats that differ in size, upholstery, and surface quality, the optimally to be supplied heating power or heating time, respectively, is empirically detected as a function of the desired seat temperature on the surface of the seating face or the rear and is stored in the non-volatile memory in the form of curves or tables, that a curve or table is selected from the field of characteristic curves or tables, respectively, by the microprocessor as a function of a coding recorded by the microprocessor, of the respective seat to the heated, and that then the power supply to the respective seat to be actually heated takes place in accordance with the selected curves or table.

19 Claims, 4 Drawing Sheets

METHOD AND CIRCUIT ARRANGEMENT FOR OPERATING AN ELECTRIC SEAT HEATING MEANS OF A VEHICLE

This application is a continuation of application Ser. No. 08/569,081, filed Dec. 4, 1995 which is a 371 of PCT/EP94/01601, filed May 18, 1994.

BACKGROUND OF THE INVENTION

FIELD OF THE INVENTION

The invention relates to a method and a circuit arrangement for operating an electric seat heating means of a vehicle, the unheated vehicle seat being heated up by the maximally available or admissible heating power in a first phase after the starting, and a switch-over to controlled operation being performed after a certain given heat-up time or temperature, respectively, has been reached.

BACKGROUND OF THE ART

A method of this type and a corresponding circuit arrangement are described for example by DE 33 29 354 C2.

With vehicle seat heating means of this type, a basic requirement resides in the user being given, promptly after the switching-on, the subjective feeling that the heating means works, i.e. the feeling of a temperature rise and the resulting seating comfort. Accordingly, after the starting of the seat heating means, as high as possible a heating power must be used as a rule, whereas, once the desired temperature has been reached, it must be ensured that this temperature is kept uniform while the heating power is reduced and that overheating is avoided.

For the realization of these requirements, there are various methods to operate a seat heating means of this type. In the simplest of cases, the heating up is performed at a constant power supply, a balance ensuing, after a while, between the supplied electric power and the thermal output delivered by thermal radiation and conduction. On the one hand, this method has the basic disadvantage that there is no making use of a high initial heating power, because the power supply must orient itself by the desired state of balance, and that, on the other hand, individual properties of the seat and the user's demands cannot be taken into account.

For the purpose of limiting the heating power once a certain desired temperature has been reached, it is also possible to use bimetallic thermostats or similar thermostats, control systems of this type exhibiting, however, high switching tolerances.

High-low action control systems are more convenient, it being possible to mount a temperature sensor in the vicinity of the seat heating means for detecting the actual temperature, or to use for instance the resistance temperature gradient of the heating strand to derive a controller input signal.

The temperature sensor systems mentioned first have the disadvantage that the necessity of such a temperature sensor demands for additional requirements, the temperature sensor itself having to be installed as a separate component, on the one hand, and supply lines being necessary within the heating element, cable loom contacts having to be provided on the heating elements, and plug connectors and contact terminals being needed. The method, mentioned last, of detecting the resistance temperature gradient of the heating strand also involves considerable constructional requirements and does not meet the demand for higher comfort.

In all control methods based on actual temperature detection, a basic problem resides in that the temperature cannot be measured on the seating surface, which is where the user actually perceives the heating effect. Consequently, systems of this type neither work in individual coordination with the respective seat, for instance allowing for a relatively thin seat upholstery or a relatively thick leather upholstery, nor do they work in individual coordination with the actual use, i.e. allowing for the fact that the seat is occupied by a person at the start of the operation, nor do they respect the individual well-being that a certain temperature will confer to the respective user.

A further aspect of increasing importance in the design of the control system for such seat heating means resides in that the vehicle manufacturers very often offer seats of the most variable geometry and surface quality for a certain type of vehicle, however, on the other hand, for reasons of economy and production technique, they are interested in purchasing seat heating means and control systems as complete modules ready to be installed, these demands, which rival per se, precluding any optimal adaptation of the heating-up and heating behavior of the seat heating means toward the respective type of seat even within the very same vehicle line.

SUMMARY OF THE INVENTION

With the above considerations in mind, it is the object of the invention to create a method and a circuit arrangement, by means of which a high degree of individual adaptation regarding the type of seat as well as the person of the user is ensured, accompanied by a minor demand for cabling and terminals on the vehicle.

In accordance with the invention, this object is attained in that, the given heat-up time or temperature, respectively, being reached after the first heating phase, the heating power is preset by a microprocessor as a function of a field of characteristic curves or tables stored in a non-volatile memory such that for seats that differ in size, upholstery, and surface quality, the optimally supplied heating power or heating time, respectively, is empirically detected as a function of the desired seat temperature on the surface of the seating face or the seat the heating power stored in the non-volatile memory is selected from the field of characteristic curves or tables, respectively, by a microprocessor as a function of a coding recorded by the microprocessor, of a respective seat to the heated thereafter, the power supply to the respective seat to be actually heated takes place in accordance with the selected curves or table.

The power supply can be metered in accordance with the methods known, i.e. for example via a change in voltage, via the pulse width, pulse frequency or even via a high-low action control system having a correspondingly stored control behavior.

The solution according to the invention offers an entirely new way in as much as an optimal temperature behavior on the seat surface can be reached even for totally different seats without any temperature measurements taking place on the surface of the seat. The preparation of the seat heating means and the control system as an essentially independent module easy to install is facilitated considerably.

In keeping with another object of the invention, it can be provided that operating data such as the inside temperature, the outside temperature, the temperature taken on the underside of the seat surface, the occupation of the seat by a person, the running state of the vehicle, the working state of, and the demand on, the vehicle battery etc. are recorded and taken into account for the selection of the curves or tables. The consideration of these data can also be used to entirely interrupt the power take-up by the seat heating means for instance when the motor is started, which regularly means a high demand of power from the vehicle battery. The power take-up can further be reduced or interrupted if the vehicle battery is weakened or if there is too high a demand on it by other consumers such as the rear window heater and the light.

In keeping with an especially advantageous embodiment, it is provided that from the time of switch-over, a control of the power supply will take place exclusively in dependence on the selected curve or table, independently of the measurement of the actual temperature. Contrary to a control system based on the use of a temperature sensor, this kind of control system emphasizes the advantages of the method according to the invention, because the entire circuit and wiring requirements for temperature and measuring sensors and the measurement feedback can be dropped. Owing to the empirical measurement which may be taken right on the seat surface and at various points of the seat surface by means of a model seat, it is nevertheless possible to achieve an optimal heating behavior by storing the corresponding curves or tables.

Another embodiment favorably provides for the microprocessor selecting the characteristic curve or the table, respectively, as a function of a desired temperature preset by a user. This allows for the fact that individuals are differently sensitive to heat, there being the possibility to preset an individual temperature in a manner known per se by an input device.

Particular convenience is ensured in that the microprocessor selects the curve or table, respectively, in dependence on a stored coding individually entered for the respective user. Once a user has preset his optimal temperature or temperature distribution, it will set in whenever this person uses the vehicle. Advantageously, the selected curves or tables are combined with a coding related to the individual's seat position. This makes use of the fact that in a lot of vehicles, provision is made for the seat position to be set by servomotors in dependence on a user coding.

Advantageously, it can be provided that the respective installed vehicle seat to be heated is identified by the control system via a serial interface, CAN.

Ultimately, provision may also be made for the time of the switch-over from the first heat-up phase to be effected by the microprocessor as a function of the seat coding recognized. Correspondingly, the second controlled phase comprises not only an adaptation to the seat, but also with regard to the duration and final temperature of the heat-up phase.

The object mentioned at the outset is also attained by a circuit arrangement for the control of the heating device of an electric vehicle seat heating means, which is characterized in that it comprises a microprocessor and a non-volatile memory, in which to store a plurality of heat-up curves or tables for selection, the heating strands of the seat heating means being directly switched in dependence thereon via an output of the microprocessor and an N-channel FET-transistor. Further, such a circuit arrangement advantageously comprises a serial interface for the identification of the respective vehicle seat to be triggered.

Further details of the invention will become apparent from the ensuing description of a preferred example of embodiment, taken in conjunction with the drawing.

DESCRIPTION OF THE PREFERRED EMBODIMENT

Figure 1:
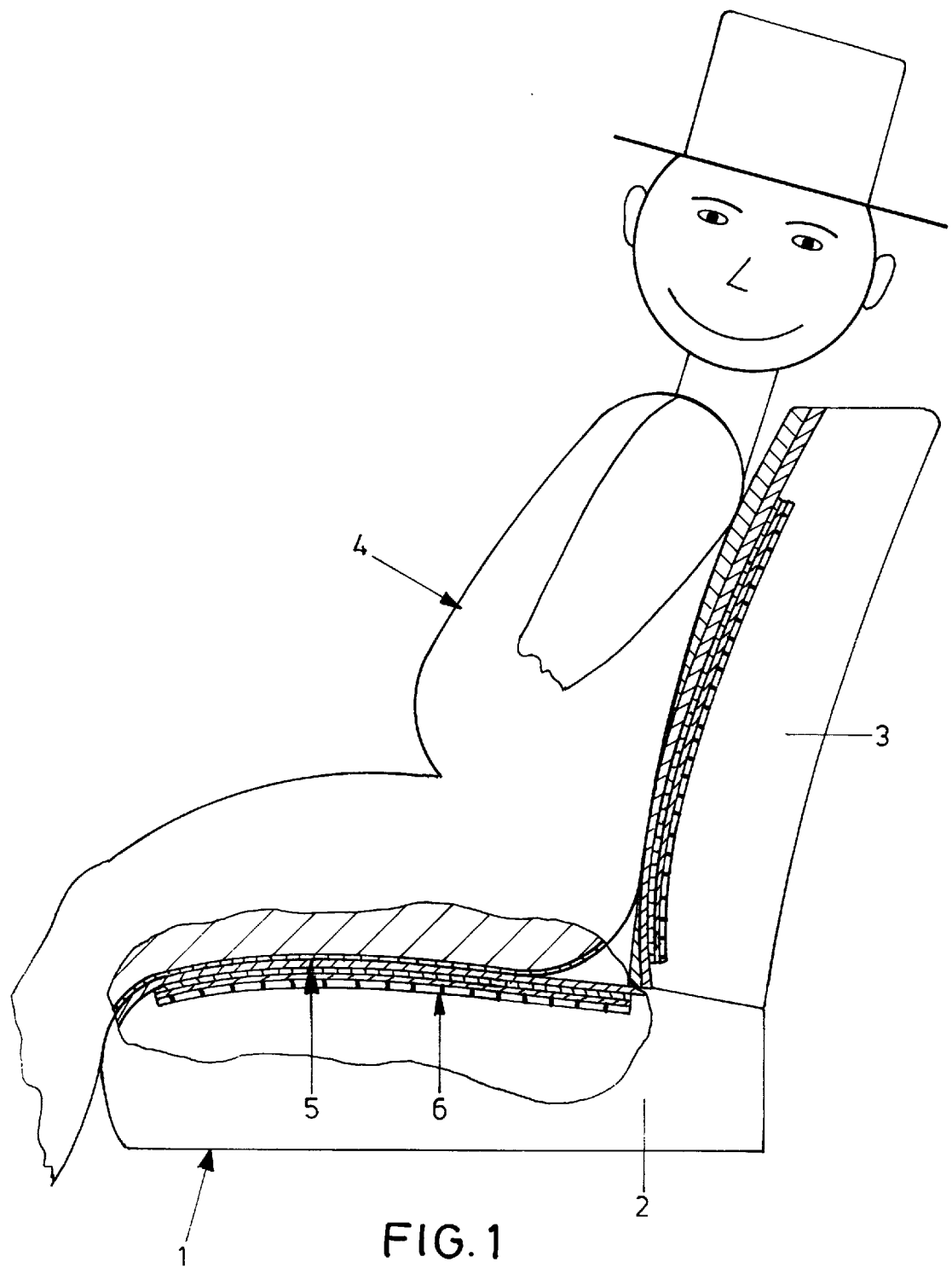
FIG. 1 is a diagrammatic side view, partially broken open, of a vehicle seat with a seat heating means.

FIG. 1 diagrammatically illustrates a vehicle seat 1 comprising a seat pad 2 and a backrest pad 3. The user 4 contacts the surface 5 of the seat pad 2 and of the backrest 3, the heating strand 6 of the seat heating means extending at a distance from this surface 5, from which results one of the controlling problems that the invention tries to solve.

Figure 2:
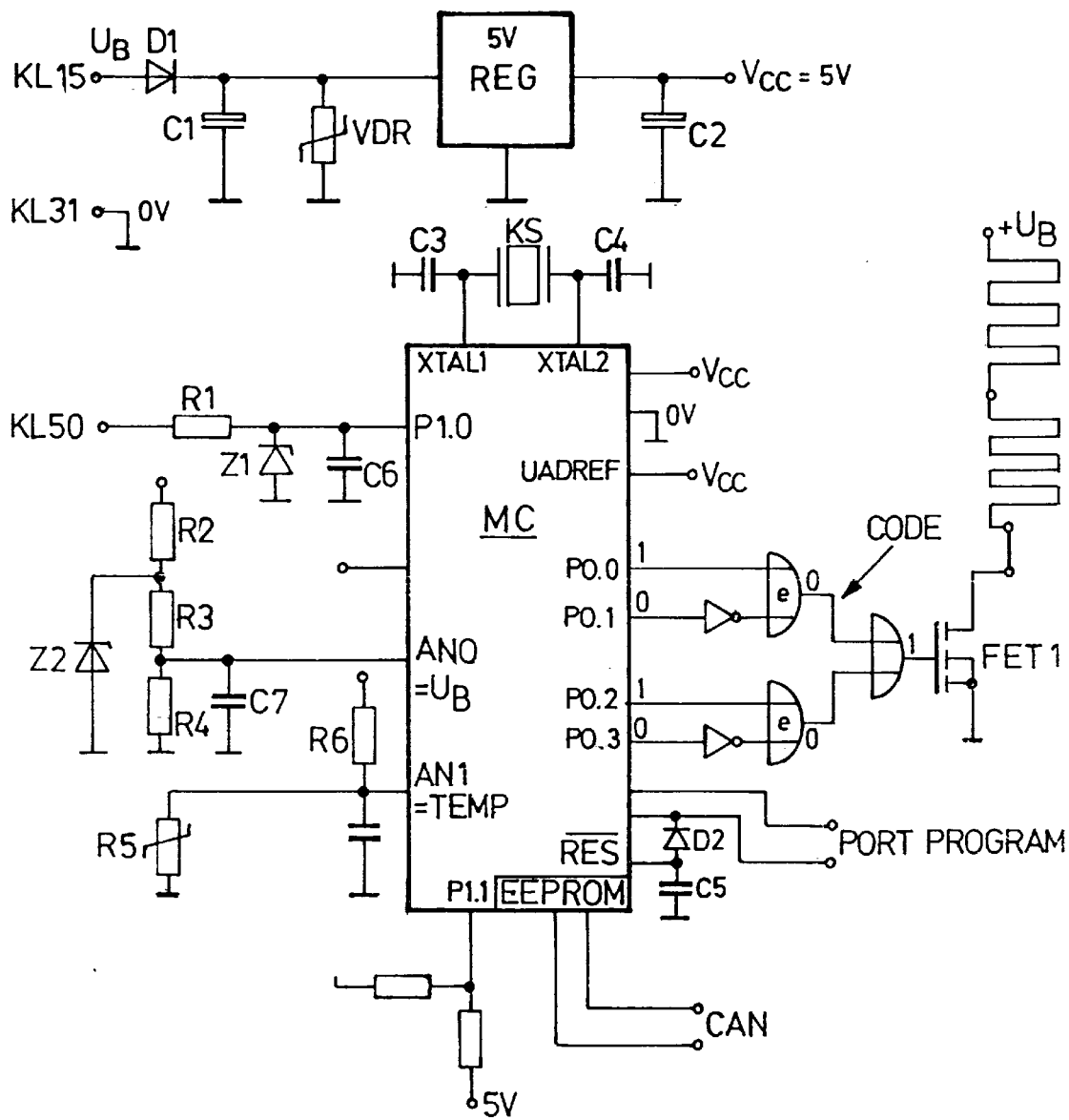
FIG. 2 is a block diagram of a circuit arrangement for a control system of a seat heating means according to the invention.

The circuit of FIG. 2 specified below serves to realize the control method according to the invention.

The battery voltage $U_B$ from the vehicle terminals KL15, KL31 is connected, via a diode D1, to a filter capacitor C1 with a VDR safety attachment circuit and to a 5-volt voltage regulator REG. The regulator REG feeds the operating voltage for the microcomputer CM, for example of the type MD68HC05P8, and the gates to a capacitor C2

The oscillation for the microcomputer MC is furnished by a ceramic oscillator KS, which is connected to ground via two capacitors C3 and C4. The ceramic oscillator KS is connected to the pins XTAL1 and XTAL2 of the microcomputer oscillator.

The RES of the microcomputer MC is wired via a capacitor CS with a discharging diode D2.

The starter signal for the actuation of the vehicle starter is connected to the microcomputer-pin port P1.0, starting from the terminal KL50 of the vehicle, via a resistor R1 with a Zener diode Z1 and a capacitor C6. The battery voltage $U_B$ is connected to a voltage divider R2, R3, R4. A Zener diode Z2 limits high input voltages to a maximum value of 5 volts at the microcomputer input ANO.

The applied voltage is filtered via a capacitor C7.

The seat temperature is detected via a temperature dependent resistor R5, which is connected to 5 volts via a voltage divider R6.

The input AN1 serves as an analog to digital converter input. The 5-volt-voltage at the microcomputer input UADREF serves as a reference for digitization in the microcomputer MC.

The heating strands 6 of the seat heating means are directly switched via an output of the microcomputer and an N-channel FET-transistor FET1. For safety reasons, a given code CODE of 1-0-1-0 or 0-1-0-1 is provided for the connection of the heating transistor. The connection is effected via the NOT-EXOR-NOR combination shown, starting from the pins P0.0 to P0.3. This logical circuit CODE may also be integrated into the microcomputer MC.

When the PIN P1.1 is connected to 1-signal, the seat identification number characterizing the design, type and size of the seat is fed to the microcomputer MC The data are entered via the serial interface or may also be entered via port P0.0 to P0.7 of the microcomputer MC.

Figure 3:
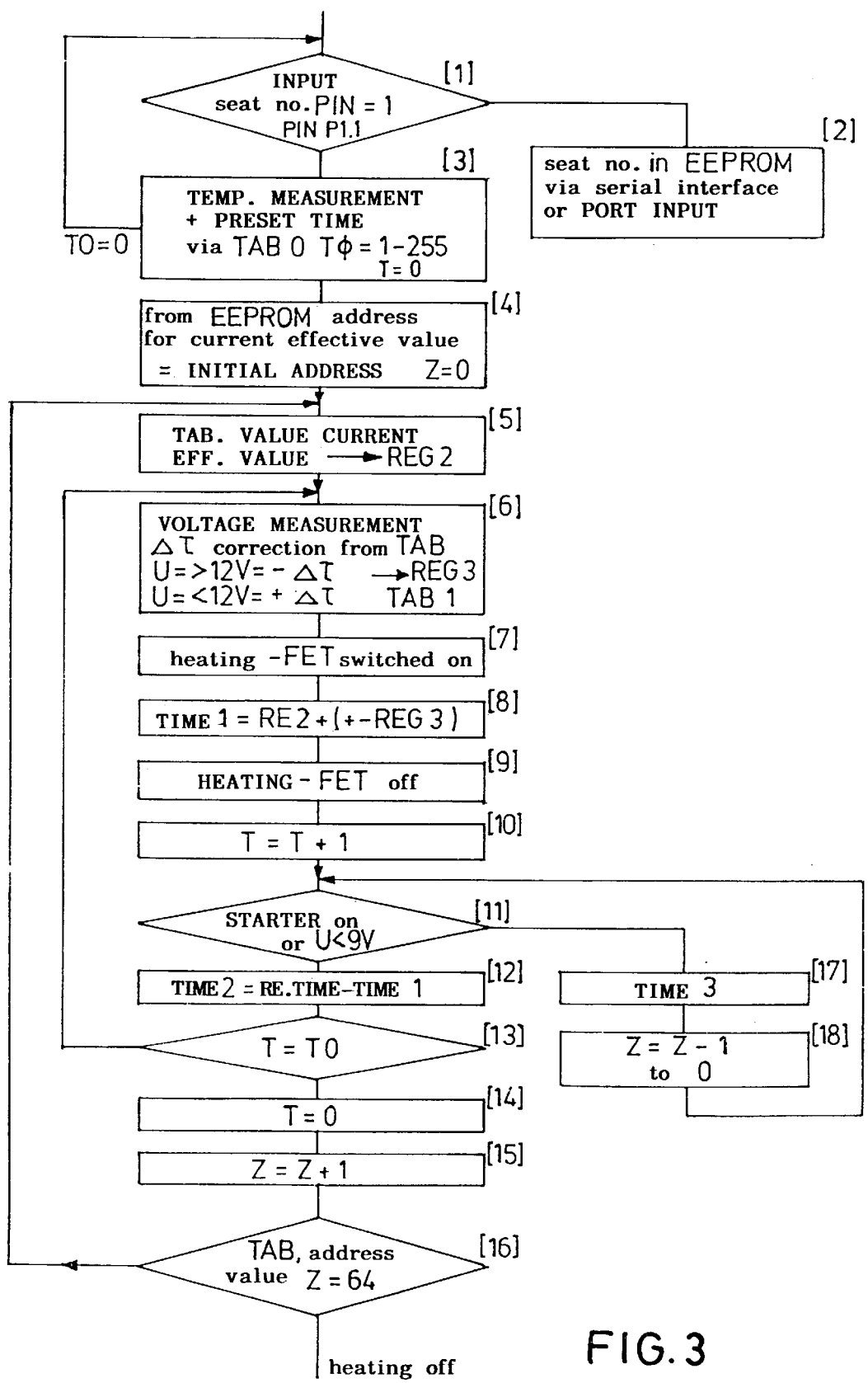
FIG. 3 is a flow chart illustrating the control method.

The program of the control system according to the invention is described in detail in the following by means of the flow chart of FIG. 3, the program phases put into brackets in the following being entered on the right above the respective boxes of the flow chart:

In [1] it is decided whether to enter the seat identification number into an internal EEPROM memory of the microcomputer MC, or whether to service the operating program.

In [2] the seat identification number is entered as a value between 0 and 255 via the serial interface (e.g. an IIC interface) or via a port, e.g. port P0.0 to P0.7.

In [3] the seat temperature is measured and a time value is correspondingly taken from a table. The time value corresponds to the number of heating current pulses, to be serviced, per current effective value from a table corresponding to the seat identification number.

If the seat is very cold, the number of pulses is accordingly high, with a warm seat the pulse number approaches 0. There is no further servicing of the operating program.

Figure 4:
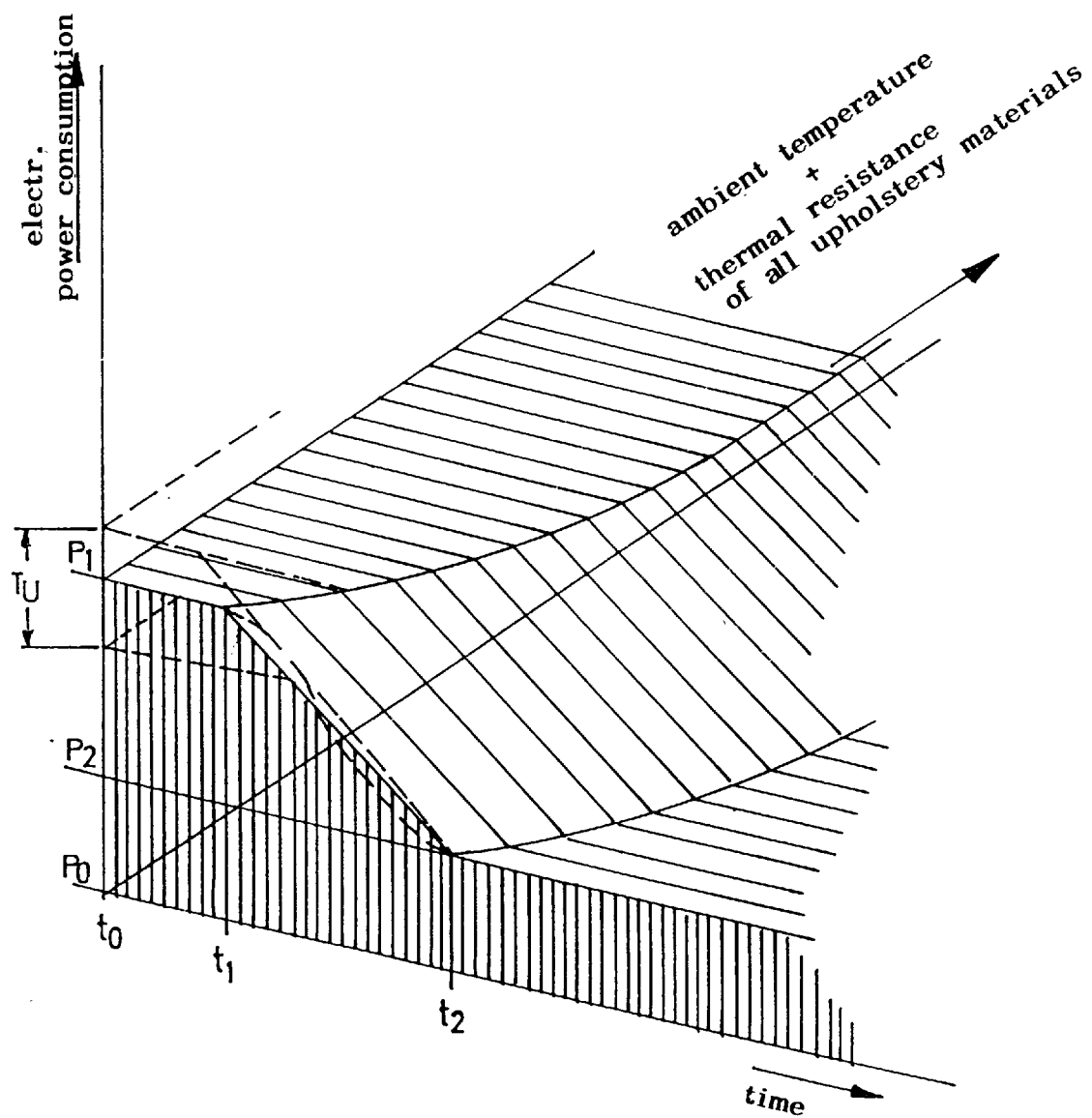
FIG. 4 is a field of characteristic curves as stored, according to the invention, for the control, and from which the control data are called.

In [4] such table is determined from the EEPROM as yields the current-time surface integral, matching the respective seat, according to the field of characteristic curves in FIG. 4. The table index reads 0.

In [5] the value corresponding to the table index is taken from the current-time table. The value refers to an operating voltage of e.g. 12 V and must be corrected to a lower value in the case of higher voltages and to a higher value in the case of lower voltages.

In [6] the operating voltage is measured and the correction factor is determined from the table (the changes are are proportional to the square of the voltage).

In [7] the N-channel FET transistor FET1 is switched on.

In [8] the corrected pulse switch-on time is serviced.

In [9] the N-channel FET transistor FET1 is switched off.

In [10] the pulse number (high with a low temperature, low with a high temperature) given by the temperature measurement is increased by 1.

In [11] it is inquired whether the starter is connected or whether the battery voltage $U_B$ is for instance below a value of 9 volts. If so, branching is performed to [17]. The FET transistor FET1 remains off until the starter is again switched off. This helps avoid too high a demand on the battery occasioned by the seat heating means and the starter being switched on simultaneously.

In [12] the breaktime minus the short time for servicing the blocks 13 and 6 is serviced.

In [13] the decision is made whether the pulses of equal current table value are completely serviced.

In [14] the pulse counter is set to 0.

In [15] the table values are increased. They are for example 64 for the current-time-values. With Z=Z+1, the table index is increased by 1.

In [16], if all the storage locations from 0 to 63 are serviced, the current-time surface integral of the seat heating is completely serviced. The operating program is left for a program for a further reheating, the reheating being effected under a two- or three-position control or controlled in accordance with stored tables.

In [17] a fixed time is serviced.

In [18] the value of the table index for the current-time surface integral is decreased by 1, if for instance the starting of the engine takes a very long time. The current-effective surface integral is then repeated in part or entirely.

In FIG. 4, the time t is plotted along the X axis, the electric power input P of the heating strands of the seat heating means is plotted along the Y axis and the additive thermal resistance is plotted along the Z axis as a sum parameter of all upholstery materials involved.

As a fourth component (not shown in the drawing) to be considered in the programmable tables, the ambient temperature can be taken into account in such a manner that in the case of high outside temperatures, the initial heating process, which takes place at a maximum heating power, is shortened or suppressed in order to avoid the occurrence of risky or uncomfortable temperature rises under particularly hot climate conditions.

In the normal case, the field of characteristic curves will show, in the Y-Z plane, the maximum possible heating P1 at the time $t_0$ which results from the relevant port voltage and from the fixed resistance of the heating element at the beginning of the heat-up process.

This initial maximum heating power P1 is maintained unchanged up to a point of time $t_1$, the time by which $t_1$ is reached being a function of the additive thermal resistance as well as of influences of the ambient temperature.

From the point of time $t_1$ to the point of time $t_2$ there is a controlled reduction of the heating power so that the seat temperature programmed or individually preset by the user is achieved at the time $t_2$, this seat temperature then being kept constant in a controlled manner by further heating current pulses.

In the field of characteristic curves shown by way of example, the dependency of the point of time $t_2$ on the additive thermal resistance and the ambient temperature extends corresponding to that of $t_1$, which does not necessarily have to be so.

The invention claimed is:

1. A method for operating an electric seat heating means for a vehicle, comprising the steps of:

heating an unheated vehicle seat (1) to a maximally available heating power in a first phase after starting the vehicle, switching to controlled operation of the seat heating means after a given heat-up time or temperature, respectively is reached, presetting the heating power to reach the given heat-up time or temperature, respectively, with a microprocessor (MC) as a function of a field of characteristic curves or tables stored in a non-volatile memory wherein, for a seat (1) that differs in size, upholstery, and surface quality, the optimum supplied heating power or heating time, respectively, is empirically detected as a function of the desired seat temperature on the surface of the seat and is stored in the non-volatile memory in the form of curves or tables, a curve or table is selected from the field of characteristic curves or tables, respectively, by the microprocessor as a function of a coding recorded by the microprocessor (MC), of the a seat (1) to be heated, the power supply to the seat heated takes place in accordance with the selected curves or table, and wherein operating data such as inside temperature, outside temperature, a temperature taken on the underside of the seat surface, whether a seat (1) is occupied by a person (4), running state of the vehicle, instantaneous voltage of the supply system, are recorded and taken into account for the selection of the curves or tables.

2. A method according to claim 1, wherein when switching to controlled operation, a control of the power supply takes place in dependence on the selected curve or table, respectively, independent of the measurement of an actual temperature.

3. A method according to claim 1, wherein the microprocessor (MC) selects the characteristic curve or the table, respectively, as a function of a desired temperature preset by a user (4).

4. A method according to claim 1, wherein the microprocessor (MC) selects the curve or table, respectively, in dependence on a stored coding individually entered by a user.

5. Method according to claim 1, wherein the selection of curves or tables, respectively, is combined with a seat position coding related to a person occupying a seat.

6. A method according to claim 1, wherein the seat (1) to be heated is identified by the control system via a serial interface.

7. A circuit arrangement in an electric seat heating means for a vehicle, comprising an unheated vehicle seat (1) heated to a maximally available heating power in a first phase after starting the vehicle, switching means for controlling operation of the heat means after a given heat-up time or temperature, respectively has been reached, a microprocessor and a non-volatile memory which store a plurality of heat-up curves or heat-up tables, respectively for selection, wherein said seat heating means is switched by an output of said microprocessor and wherein a serial interface is provided for identifying a vehicle seat to be heated.

8. A method of electrically heating a seat having thermal seat characteristics, the method comprising steps of:

providing a microprocessor controlling an electric heating power delivered to the seat, the microprocessor including a non-volatile memory;

installing in the memory a plurality of look-up tables or curves, each of the tables or curves determining the electric heating power as a function of time;

installing in the microprocessor a program for selecting one of the tables or curves stored in the memory;

first applying, in a heat-up phase, a maximum available electric heating power until a given heat-up temperature condition is reached or a given heat-up time interval is elapsed;

then selecting, according to at least one parameter, one of the tables or curves; and controlling the electric heating power according to the selected one of the tables or curves.

9. The method according to claim 8, wherein the tables or curves include a controlled reduction portion and a steady-state portion.

10. The method according to claim 8, wherein the parameter includes occupancy of the seat by a person.

11. The method according to claim 8, wherein the parameter includes manual adjustment.

12. The method according to claim 8, wherein the parameter includes ambient temperature.

13. The method according to claim 8, wherein the parameter includes a thermal characteristic of the seat.

14. The method according to claim 13, including a step of providing an interface between the seat and the microprocessor, whereby the seat is digitally identified to the microprocessor and the thermal characteristic is available to the microprocessor.

15. The method according to claim 8, wherein the parameter does not include a temperature measured on a surface of the seat.

16. The method according to claim 8, wherein the parameter includes a temperature measured on an underside of the seat.

17. The method according to claim 8, wherein the parameter includes a duration or a maximum temperature of the heat-up phase.

18. The method according to claim 8, wherein the parameter includes electrical system operating characteristics.

19. The method according to claim 8, wherein the parameter includes a combination of ambient temperature and thermal resistance of the seat.

* * * * *